United States Patent
Park

(10) Patent No.: US 8,629,825 B2
(45) Date of Patent: Jan. 14, 2014

(54) LIQUID CRYSTAL DISPLAY DEVICE AND METHOD OF DRIVING THE SAME

(75) Inventor: Jin-Woo Park, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1026 days.

(21) Appl. No.: 12/333,019

(22) Filed: Dec. 11, 2008

(65) Prior Publication Data

US 2009/0201437 A1 Aug. 13, 2009

(30) Foreign Application Priority Data

Feb. 11, 2008 (KR) .................. 10-2008-0012338

(51) Int. Cl.
G09G 3/36 (2006.01)
G02F 1/1343 (2006.01)

(52) U.S. Cl.
USPC .............................................. 345/96; 349/38

(58) Field of Classification Search
USPC ................... 345/87–104; 349/1–202
See application file for complete search history.

(56) References Cited

U.S. PATENT DOCUMENTS

| 5,633,738 A | * | 5/1997 | Wakui et al. | 349/46 |
| 6,160,535 A | * | 12/2000 | Park | 345/88 |
| 2008/0129906 A1 | * | 6/2008 | Lin et al. | 349/38 |

FOREIGN PATENT DOCUMENTS

| JP | 11-161243 | 6/1999 |
| JP | 2002-189203 | 7/2002 |
| KR | 1996-0008391 | 3/1996 |
| KR | 2000-0000788 | 1/2000 |
| KR | 2002-0048693 | 6/2002 |

OTHER PUBLICATIONS

Korean Office action dated Apr. 17, 2009, for priority Korean application 10-2008-0012338, noting listed references in this IDS.

* cited by examiner

*Primary Examiner* — Kenneth Bukowski
(74) *Attorney, Agent, or Firm* — Christie, Parker & Hale, LLP

(57) ABSTRACT

A liquid crystal display device and a method of driving the same are provided. The liquid crystal display device includes a first coupling capacitor and a second coupling capacitor, which are coupled to corresponding data lines among a plurality of data lines and are coupled to a first auxiliary data line and a second auxiliary data line, respectively. Using a plurality of the first and second coupling capacitors, the liquid crystal display device can be driven by a dot inversion driving method with reduced power consumption as a result of using a low data signal voltage.

20 Claims, 6 Drawing Sheets

FIG. 5A

| + | − | + | − | + | − | + | − |
|---|---|---|---|---|---|---|---|
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |

FIG. 5B

| − | + | − | + | − | + | − | + |
|---|---|---|---|---|---|---|---|
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |

LIQUID CRYSTAL DISPLAY DEVICE AND METHOD OF DRIVING THE SAME

CROSS-REFERENCE TO RELATED APPLICATION

This application claims priority to and the benefit of Korean Patent Application No. 10-2008-0012338, filed on Feb. 11, 2008, the disclosure of which is hereby incorporated herein by reference in its entirety.

BACKGROUND OF THE INVENTION

1. Field of the Invention

The present invention relates to a liquid crystal display device and a method of driving the same, and more particularly, to a dot inversion-type liquid crystal display device and a method of driving the same.

2. Description of the Related Art

Generally, liquid crystal display (LCD) devices control optical transmittance of liquid crystals using an electrical field so as to display images. The LCD device includes a liquid crystal panel in which a plurality of pixels each having a liquid crystal capacitor are arranged in a matrix, and a driving circuit for driving the liquid crystal panel.

The LCD devices are typically driven by an inversion method to prevent degradation of liquid crystals and improve the quality of images being displayed. The inversion method includes a frame inversion method, a dot inversion method, a line inversion method, etc.

In the frame inversion method, the polarities of the voltage applied to the liquid crystal molecules between a common electrode and a pixel electrode are repeatedly reversed frame by frame.

When a positive data voltage is applied in an even frame, a negative data voltage is applied in an odd frame.

While the frame inversion method consumes a small amount of power during switching, it is sensitive to a flicker phenomenon caused by asymmetric transmittances of positive and negative polarities and is vulnerable to crosstalk caused by interference between data.

In the line inversion method that is generally and widely applied in low resolution display devices such as VGA and SVGA displays, a data voltage is applied such that the voltage polarities of the pixels are changed in units of horizontal lines, line by line.

When a positive data voltage is applied to an odd line, and a negative data voltage is applied to an even line, in a next frame, opposite polarities of voltages are applied.

The line inversion method experiences less flicker phenomenon as compared with the frame inversion method since data voltages applied to adjacent lines have opposite polarities to one another. Further, voltages having opposite polarities are applied in a vertical direction, so that a coupling phenomenon occurring between data is compensated for, and little vertical crosstalk occurs as compared with the frame inversion method.

However, in a horizontal direction, voltages having the same polarity are applied, so that horizontal crosstalk occurs, and the number of switching cycle is increased compared with the frame inversion method, thereby increasing power consumption.

In the dot inversion method, data voltages having opposite polarities are applied between adjacent pixels in all directions (i.e., up/down and right/left). When a positive data voltage is applied to one of a plurality of pixels, a negative data voltage is applied to an adjacent pixel, and in the next frame, voltages having polarities opposite to the voltage polarities of the previous frame are applied.

The dot inversion method provides a higher quality image in comparison to other inversion methods, by compensating for the flicker phenomenon occurring between adjacent pixels in vertical and horizontal directions.

For this reason, among all polarity inversion methods, the dot inversion method can display the highest quality image and thus is widely applied to high resolution display devices such as XGA, SXGA and UXGA displays. However, the dot inversion method consumes larger amount of power compared to other inversion methods.

In the line inversion method, a polarity of a data signal Sd is inverted in every cycle, and a polarity of common voltage Vcom corresponding thereto is also inverted. Accordingly, in the line inversion method, since a polarity of the common voltage Vcom is inverted to correspond to the data signal Sd, a potential difference of 2Vd between the common voltage Vcom and the data signal Sd can be made even when a data voltage of Vd is applied.

In the dot inversion method, a polarity of the data signal Sd is inverted in every cycle with respect to a common voltage Vcom that is fixed. Accordingly, in the dot inversion method, when a data voltage of 2Vd is applied, a potential difference of 2Vd between the common voltage Vcom and the data signal Sd can be made. Here, the power consumption p is $cv^2f$, which is four times higher than that in the line inversion method.

SUMMARY OF THE INVENTION

Embodiments of the present invention provide a liquid crystal display device and a method of driving the same. The liquid crystal display device is driven by a dot inversion method with a low data signal voltage to reduce power consumption.

In an exemplary embodiment of the present invention, a liquid crystal display device includes: a substrate; a plurality of data lines on the substrate; a plurality of gate lines crossing the data lines; a plurality of pixels arranged in a matrix and coupled to the data lines and the gate lines; a first auxiliary data line and a second auxiliary data line extending on the substrate and crossing the data lines; a first coupling capacitor coupled between a first data line among the data lines and the first auxiliary data line; and a second coupling capacitor coupled between a second data line among the data lines and the second auxiliary data line. The first data line and the second data line are adjacent to each other.

In another exemplary embodiment of the present invention, a method of driving a liquid crystal display device includes: providing gate signals to a plurality of gate lines on a substrate; providing data signals to a plurality of data lines crossing the gate lines; and providing a first auxiliary data signal and a second auxiliary data signal, which are in an inverted relationship, to a first auxiliary data line and a second auxiliary data line, respectively. The first auxiliary data line and the second auxiliary data line are coupled to corresponding data lines among the data lines through a first coupling capacitor and a second coupling capacitor, respectively. Thereby, pixel voltages of a plurality of pixels coupled to the data lines and the gate lines are dot-inverted.

In yet another exemplary embodiment of the present invention, a liquid crystal display device is provided. The liquid crystal display device includes: a substrate; a plurality of data lines on the substrate; a plurality of gate lines crossing the plurality of data lines; a plurality of pixels arranged in a matrix and coupled to the data lines and the gate lines; a first auxiliary data line and a second auxiliary data line extending on the substrate and crossing the data lines; a plurality of first coupling capacitors each coupled between a corresponding odd data line among the data lines and the first auxiliary data line; and a plurality of second coupling capacitors each coupled between a corresponding even data line among the data lines and the second auxiliary data line.

BRIEF DESCRIPTION OF THE DRAWINGS

The above and other aspects and features of the present invention will be described in reference to specific exemplary embodiments thereof with reference to the attached drawings in which:

FIGS. 5A and 5B illustrate a dot inversion driving method according to an embodiment of the present invention.

DETAILED DESCRIPTION OF EXEMPLARY EMBODIMENTS

The present invention will now be described more fully hereinafter with reference to the accompanying drawings, in which exemplary embodiments of the invention are shown.

Figure 1A:
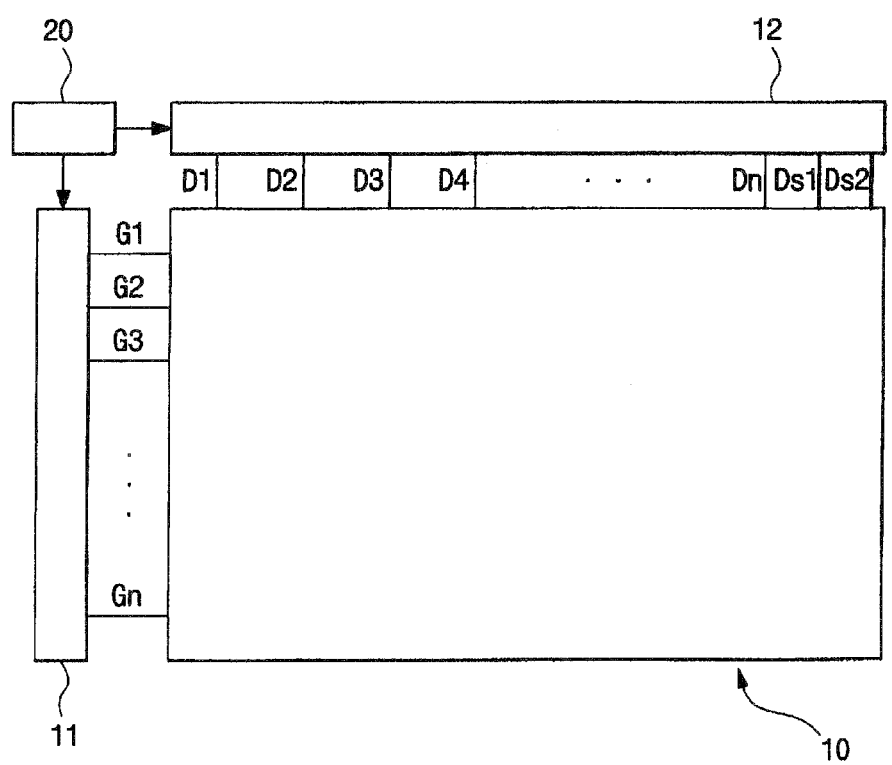
FIG. 1A is a block diagram of a liquid crystal display device according to an embodiment of the present invention.
Figure 1B:
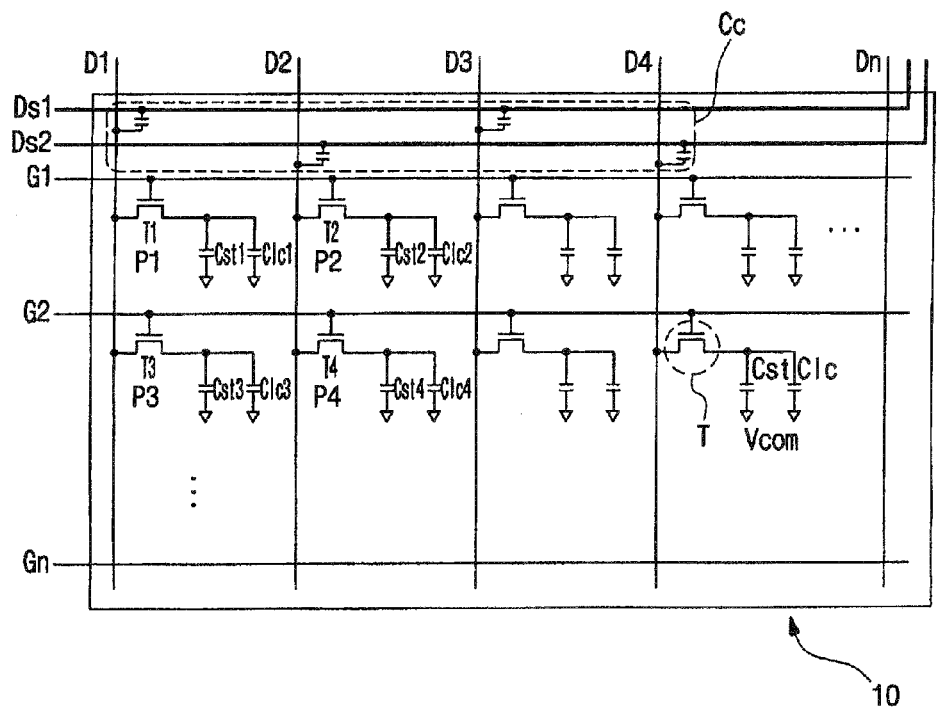
FIG. 1B is a circuit diagram of a liquid crystal display device according to an embodiment of the present invention.

FIG. 1A is a block diagram of a liquid crystal display device according to an embodiment of the present invention, and FIG. 1B is a circuit diagram of a liquid crystal display device according to an embodiment of the present invention.

First, according to FIG. 1A, a liquid crystal display device includes a liquid crystal panel 10, a gate driver 11 for supplying gate signals to gate lines G1 to Gn of the liquid crystal panel 10, a data driver 12 for applying data signals to data lines D1 to Dn of the liquid crystal panel 10 and supplying a first auxiliary data signal and a second auxiliary data signal to a first auxiliary data line Ds1 and a second auxiliary data line Ds2, respectively, and a timing controller 20 for controlling the gate driver 11 and the data driver 12.

The gate driver 11 sequentially supplies gate signals to the gate lines G1 to Gn in response to a gate control signal received from the timing controller 20.

Thin film transistors of a plurality of pixels of the liquid crystal panel 10 are coupled to the gate lines G1 to Gn and are driven in groups by the unit of the gate lines G1 to Gn.

The data driver 12 supplies data signals to the data lines D1 to Dn in response to a data control signal received from the timing controller 20. Here, the data driver 12 converts pixel data (R, G and B) provided from the timing controller 20 into data signals (Sd1 to Sdn) using gamma voltage.

The data driver 12 also provides the first auxiliary data signal and the second auxiliary data signal, which are in an inverted relationship, to the first auxiliary data line Ds1 and the second auxiliary data line Ds2. The first auxiliary data line Ds1 and the second auxiliary data line Ds2 cross the data lines D1 to Dn.

The timing controller 20 provides the gate control signal and the data control signal to control the gate driver 11 and the data driver 12, respectively. Here, the pixel data (R, G or B) are provided to the data driver 12.

The liquid crystal panel 10 will now be described with reference to FIG. 1B in more detail.

Referring to FIG. 1B, the liquid crystal panel 10 includes a plurality of data lines D1 to Dn extending in one direction on a substrate, a plurality of gate lines G1 to Gn crossing the plurality of data lines D1 and Dn, and a plurality of pixels arranged in a matrix in a display region and connected with the data lines D1 to Dn and the gate lines G1 to Gn.

The liquid crystal panel 10 further includes the first auxiliary data line Ds1 and the second auxiliary data line Ds2 disposed at a non-display region at one side of the substrate and crossing the data lines D1 to Dn, and a coupling capacitor Cc. The coupling capacitor Cc includes a plurality of first coupling capacitors Cc1 and a plurality of second coupling capacitors Cc2. The first coupling capacitors Cc1 are coupled between the odd data lines (e.g., D1, D3, D5 . . . ) and the first auxiliary data line Ds1, and the second coupling capacitors Cc2 are coupled between the even data lines (e.g., D2, D4, D6 . . . ) and the second auxiliary data line Ds2.

Each of the pixels includes a thin film transistor T, a liquid crystal capacitor Clc and a storage capacitor Cst, which are coupled to the thin film transistor T.

Figure 2:
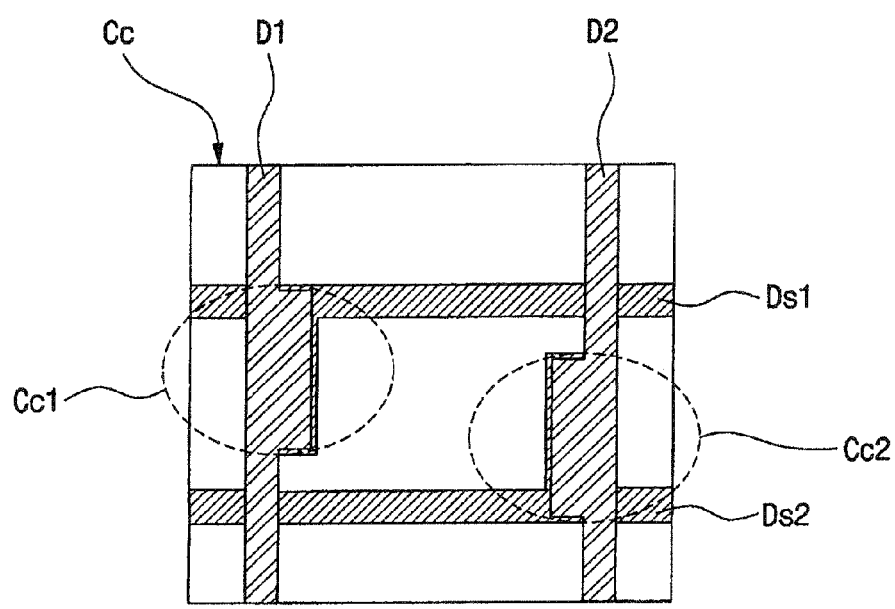
FIG. 2 is an enlarged view of a portion of a coupling capacitor of FIG. 1B.

FIG. 2 is an enlarged view of a portion of the coupling capacitor Cc of FIG. 1B.

Referring to FIG. 2, an extension (e.g., a specific pattern extension) from the first auxiliary data line Ds1 in a vertical direction corresponds to and is electrically insulated from an extension (e.g., a specific pattern extension) from the first data line D1 in a horizontal direction, so that the first coupling capacitor Cc1 is formed.

In addition, an extension (e.g., a specific pattern extension) from the second auxiliary data line Ds2 in a vertical direction corresponds to and is electrically insulated from an extension (e.g., a specific pattern extension) from the second data line D2 in a horizontal direction, so that the second coupling capacitor Cc2 is formed.

Figure 3:
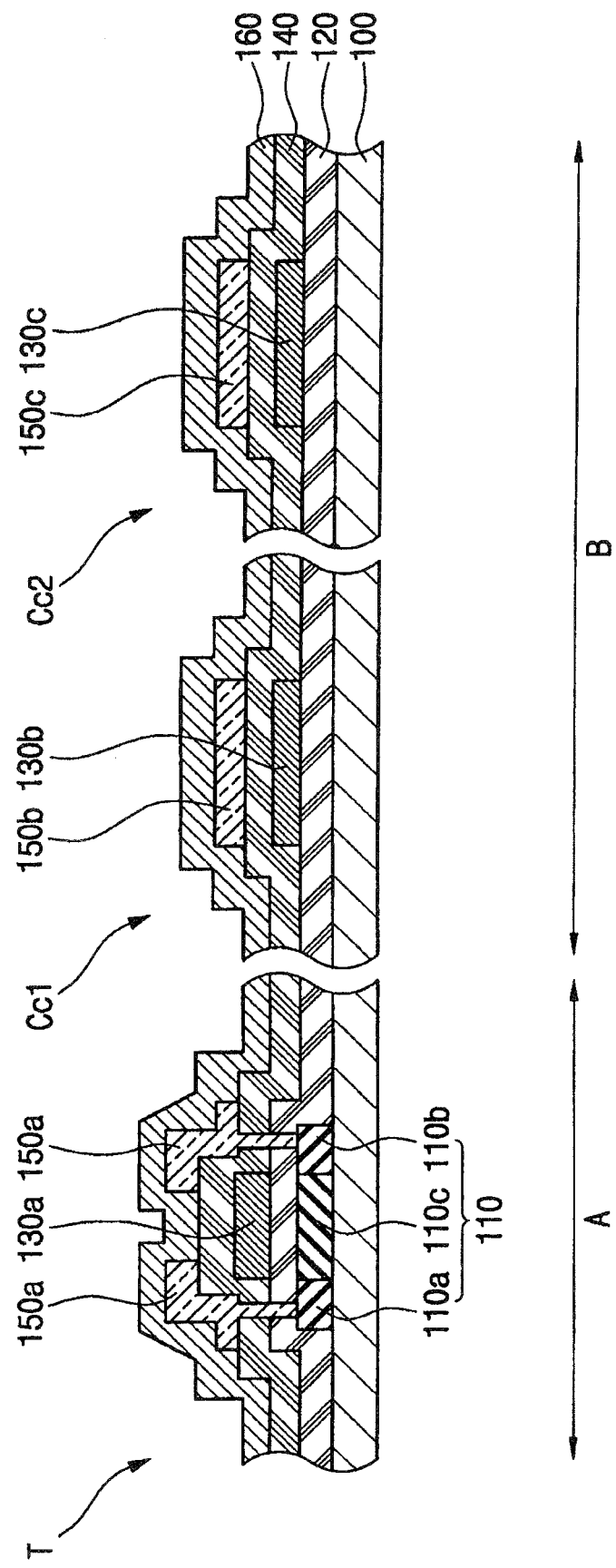
FIG. 3 is a cross-sectional view of a thin film transistor, a first coupling capacitor and a second coupling capacitor in a liquid crystal display device according to an embodiment of the present invention.

Methods of forming the first and second coupling capacitors Cc1 and Cc2 will now be described with reference to FIG. 3 illustrating a thin film transistor T.

FIG. 3 is a cross-sectional view illustrating the thin film transistor T, a first coupling capacitor Cc1 and a second coupling capacitor Cc2 of a liquid crystal display device according to an embodiment of the present invention.

Referring to FIG. 3, first, a substrate 100 is provided, which includes a display region A having thin film transistors T disposed at respective pixels and a non-display region B having a plurality of first coupling capacitors Cc1 and a plurality of second coupling capacitors Cc2.

Subsequently, an amorphous silicon layer may be formed in the display region A on the substrate 100 and then crystallized into a polycrystalline silicon layer.

The polycrystalline silicon layer is patterned into a specific pattern so as to form a semiconductor layer 110 in the display region A.

A gate insulating layer 120 is formed on the entire surface of the substrate 100, and a gate metal layer is deposited on the gate insulating layer 120.

In the display region A, the gate metal layer is patterned to form a gate electrode 130a corresponding to a specific region of the semiconductor layer 110.

In the non-display region B, the gate metal layer is patterned to form a first electrode 130b for a first coupling capacitor Cc1 and a first electrode 130c for a second coupling capacitor Cc2, both having a specific pattern.

Here, the first electrode 130b of the first coupling capacitor Cc1 is coupled to the first auxiliary data line Ds1, and the first electrode 130c of the second coupling capacitor Cc2 is coupled to the second auxiliary data line Ds2.

Subsequently, the semiconductor layer 110 is doped with N-type or P-type impurities to form source and drain regions 110a and 110b. Here, a channel region 110c is formed between the source and drain regions 110a and 110b of the semiconductor layer 110.

An interlayer insulating layer 140 is formed on the entire surface of the substrate 100.

In the display region A, the interlayer insulating layer 140 and the gate insulating layer 120 are etched to form contact holes partially exposing the source and drain regions 110a and 110b of the semiconductor layer 110.

Source and drain metal layers are deposited on the interlayer insulating layer 140 formed on the entire surface of the substrate 100.

The source and drain metal layers in the display region A are patterned into specific patterns to form source and drain electrodes 150a connected with the source and drain regions 110a and 110b of the semiconductor layer 110 through the contact holes, respectively.

In the non-display region B, the source and drain metal layers are patterned into specific patterns to form a second electrode 150b of the first coupling capacitor Cc1 corresponding to the first electrode 130b of the first coupling capacitor Cc1. Further, a second electrode 150c of the second coupling capacitor Cc2 is formed to correspond to the first electrode 130c of the second coupling capacitor Cc2.

Here, the second electrode 150b is connected to the first data line D1, and the second electrode 150c is connected to the second data line D2.

Subsequently, a passivation layer 160 is formed on the entire surface of the substrate 100.

In the above description, the first coupling capacitor Cc1 and the second coupling capacitor Cc2 are formed using the first data line D1 and the second data line D2, respectively, and may also be alternately formed by the plurality of data lines D1 to Dn in accordance with the same method as described above.

Further, while a top-gate thin film transistor T that is formed on the substrate 100 is shown in FIG. 3, the present invention is not limited thereto, and thus a conventional bottom-gate transistor may be applied in the present invention.

A method of driving a liquid crystal display device according to an embodiment of the present invention will now be described in detail.

For the convenience of description, first to fourth pixels P1 to P4 among the plurality of pixels will be described with reference to FIGS. 1A and 1B.

In the liquid crystal panel 10, a plurality of pixels including the first pixel P1, the second pixel P2, the third pixel P3 and the fourth pixel P4 are arranged in a matrix.

First, thin film transistors T included in the respective pixels are turned on when a gate driver 11 applies gate signals Sg1 to Sgn in a high state to a plurality of gate lines G1 to Gn.

Subsequently, data signals Sd1 to Sdn, which are provided to a plurality of data lines D1 to Dn from the data drive 12, are provided to a liquid crystal capacitor Clc and a storage capacitor Cst through the thin film transistor T when it is turned on.

A first auxiliary data signal Ssd1 and a second auxiliary data signal Ssd2, which are provided to the first auxiliary data line Ds1 and the second auxiliary data line Ds2 from the data driver 12, are provided to the liquid crystal capacitor Clc and the storage capacitor Cst through the first coupling capacitor Cc1 and the second coupling capacitor Cc2.

The liquid crystal capacitor Clc includes liquid crystals between a pixel electrode to which a pixel voltage Vp is applied and a common electrode to which a common voltage Vcom is applied, and the liquid crystals serve as a dielectric.

Here, optical transmittance is controlled by applying a voltage corresponding to a difference between the pixel voltage Vp and the common voltage Vcom to the liquid crystals.

The pixel voltage Vp is maintained during a first frame, and the storage capacitor Cst serves to maintain the pixel voltage Vp during the first frame according to the charged voltage.

Figure 4:
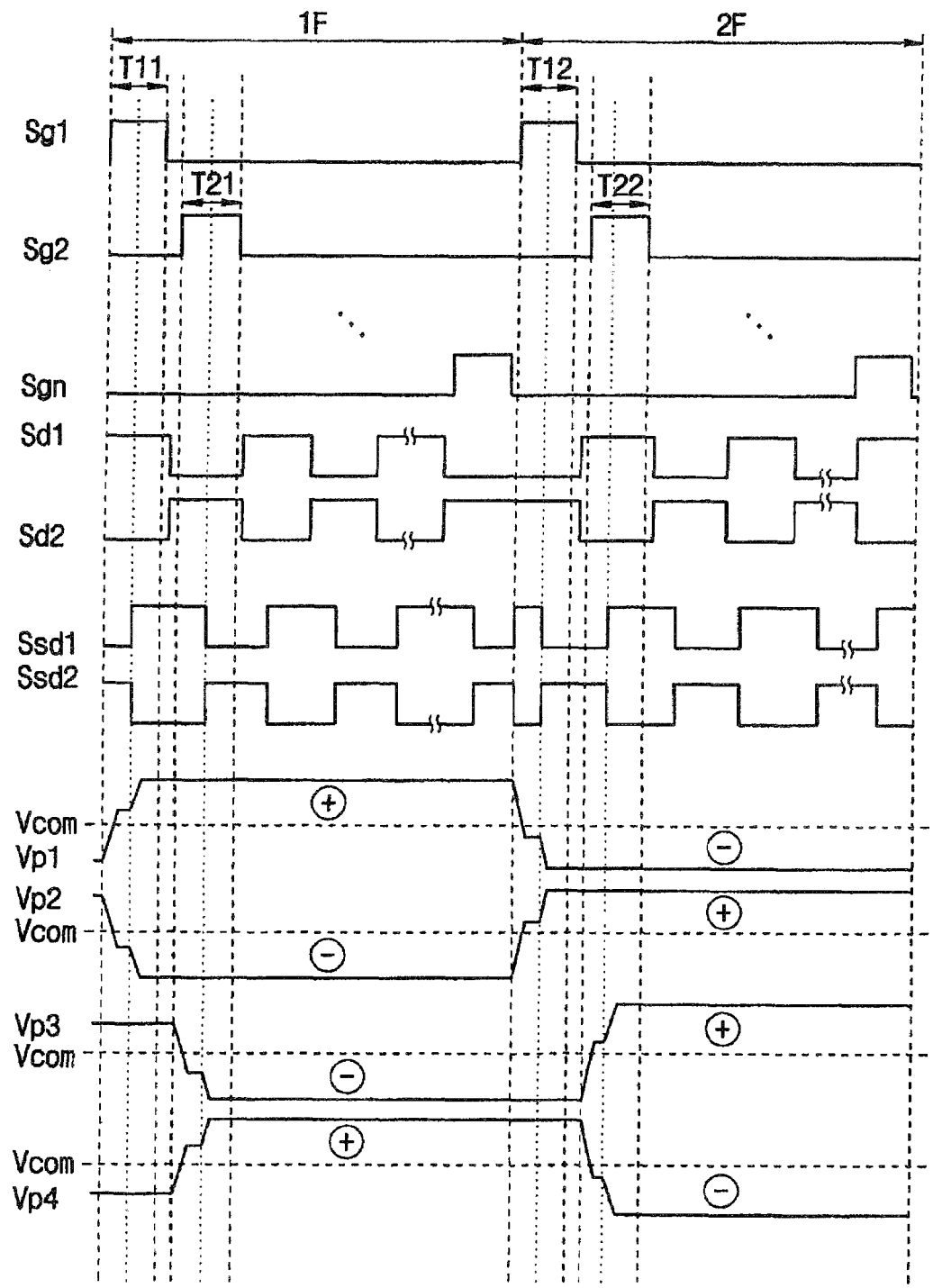
FIG. 4 is a timing diagram illustrating the operation of a liquid crystal display device according to an embodiment of the present invention.

FIG. 4 is a timing diagram illustrating the operation of the liquid crystal display device according to an embodiment of the present invention.

Referring to FIG. 4, in a first frame 1F while driving a first pixel P1, the first gate signal Sg1 is provided to the first gate line G1. Here, in a T11 section in which the first gate signal Sg1 is in a high state, a first thin film transistor T1 (shown in FIG. 1B) is turned on.

When the first thin film transistor T1 is turned on, the first data signal Sd1 provided from the first data line D1 is provided to a first liquid crystal capacitor Clc1 (shown in FIG. 1B) and a first storage capacitor Cst1 (shown in FIG. 1B).

Thus, a pixel voltage Vp at a voltage Vd1, which is a high voltage of the first data signal Sd1, is charged in a pixel electrode of the first liquid crystal capacitor Clc1. Here, the first auxiliary data signal Ssd1 provided to the first auxiliary data line Ds1 is in a low state, so that the voltage Vd1 is also charged in the first coupling capacitor Cc1.

Subsequently, when the first auxiliary data signal Ssd1 transitions from a low state to a high state, a high voltage Vsub1 of the first auxiliary data signal Ssd1 is added to the voltage Vd1 charged in the first coupling capacitor Cc1. Thus, a voltage of Vd1+Vsub1 is supplied to the first liquid crystal capacitor Clc1 and the first storage capacitor Cst1.

Here, a first pixel voltage Vp1 becomes Vd1+(Cc1'/Ct1)×ΔVsub1.

Cc1' is a capacitance of the first coupling capacitor Cc1, Ct1 is Cc1'+a capacitance of the capacitor of the first data line D1, and Vsub1 is a first auxiliary data voltage.

Subsequently, when the first gate signal Sg1 transitions to a low state, the first thin film transistor T1 is turned off, and the first data signal Sd1 and the first auxiliary data signal Ssd1 also transition to a low state.

Here, a phase of the first auxiliary data signal Ssd1 is delayed compared to the first data signal Sd1.

Thus, the first pixel voltage Vp1 of the first liquid crystal capacitor Clc1 is maintained during one frame at Vd1+(Cc1'/Ct1)×ΔVsub1 that is charged in the first storage capacitor Cst1.

Then, in a second frame 2F, the first gate signal Sg1 is provided to the first gate line G1. Here, in a T12 section in which the first gate signal Sg1 is in a high state, the first thin film transistor T1 is turned on.

When the first thin film transistor T1 is turned on, an inverted first data signal Sd1 provided from the first data line D1 is provided to the first liquid crystal capacitor Clc1 and the first storage capacitor Cst1.

Thus, the first pixel voltage Vp1 at 0V, which is a low voltage of the inverted first data signal Sd1, is applied to the pixel electrode of the first liquid crystal capacitor Clc1. Here, the inverted first auxiliary data signal Ssd1 provided to the first auxiliary data line Ds1 is in a high state, so that a high voltage Vsub1 of the inverted first auxiliary data signal Ssd1 is charged in the first coupling capacitor Cc1.

Subsequently, when the inverted first auxiliary data signal Ssd1 transitions to a low state, a voltage of −Vsub1 charged in the first coupling capacitor Cc1 is discharged and provided to the first liquid crystal capacitor Clc1 and the first storage capacitor Cst1.

Here, the first pixel voltage Vp1 becomes $-(Cc1'/Ct1) \times \Delta Vsub1$.

Cc1' is a capacitance of the first coupling capacitor Cc1, Ct1 is Cc1'+a capacitance of the capacitor of the first data line D1, and Vsub1 is a first auxiliary data voltage.

Subsequently, when the first gate signal Sg1 transitions to a low state, the first thin film transistor T1 is turned off, and the inverted first data signal Sd1 and the inverted first auxiliary data signal Ssd1 transition to a high state.

Here, a phase of the inverted first auxiliary data signal Ssd1 is delayed compared to the inverted first data signal Sd1.

Thus, the first pixel voltage Vp1 of the first liquid crystal capacitor Clc1 is maintained at $-(Cc1'/Ct1) \times \Delta Vsub1$ that is charged in the first storage capacitor Cst1.

As a result, with respect to the first pixel P1, the first data signal Sd1 and the first auxiliary data signal Ssd1 during the second frame 2F are inverted from those during the first frame 1F.

Thus, a polarity of the first pixel voltage Vp1 is inverted from positive to negative frame by frame, and vice versa.

In the first frame 1F while driving a second pixel P2, a first gate signal Sg1 is provided to the first gate line G1. Here, in the T11 section in which the first gate signal is in a high state, a second thin film transistor T2 (shown in FIG. 1B) is turned on.

When the second thin film transistor T2 is turned on, the second data signal Sd2, which is provided from the second data line D2, is provided to a second liquid crystal capacitor Clc2 (shown in FIG. 1B) and a second storage capacitor Cst2 (shown in FIG. 1B).

Thus, a second pixel voltage Vp2 at 0V, which is a low voltage of the second data signal Sd2, is applied to a pixel electrode of the second liquid crystal capacitor Clc2. Here, since the second auxiliary data signal Ssd2 provided from a second auxiliary data line Ds2 is in a high state, a high voltage Vsub2 of the second auxiliary data signal Ssd2 is charged to the second coupling capacitor Cc2.

Subsequently, when the second auxiliary data signal Ssd2 transitions to a low state, a voltage at −Vsub2 charged in the second coupling capacitor Cc2 is discharged and provided to the second liquid crystal capacitor Clc2 and the second storage capacitor Cst2.

Here, the second pixel voltage Vp2 becomes $-(Cc2'/Ct2) \times \Delta Vsub2$.

Cc2' is a capacitance of the second coupling capacitor Cc2, Ct2 is Cc2'+a capacitance of the capacitor of the data line, and Vsub2 is a second auxiliary data voltage.

Subsequently, when the first gate signal Sg1 transitions to a low state, the second thin film transistor T2 is turned off, and the second data signal Sd2 and the second auxiliary data signal Ssd2 transition to a high state.

Here, a phase of the second auxiliary data signal Ssd2 is delayed compared to the second data signal Sd2.

Thus, the second pixel voltage Vp2 of the second liquid crystal capacitor Clc2 is maintained at $-(Cc2'/Ct2) \times \Delta Vsub2$ that is charged in the second storage capacitor Cst2.

Then, in the second frame 2F, the first gate signal Sg1 is provided to the first gate line G1. Here, in the T12 section in which the first gate signal Sg1 is in a high state, the second thin film transistor T2 is turned on.

When the second thin film transistor T2 is turned on, an inverted second data signal Sd2 provided from the second data line D2 is provided to the second liquid crystal capacitor Clc2 and the second storage capacitor Cst2.

Thus, a second pixel voltage Vp2 at a voltage Vd2, which is a high voltage of the inverted second data signal Sd2, is charged in the pixel electrode of the second liquid crystal capacitor Clc2. Here, the inverted second auxiliary data signal Ssd2 provided from the second auxiliary data line Ds2 is in a low state so that Vd2 is charged in the second coupling capacitor Cc2 concurrently.

Subsequently, when the inverted second auxiliary data signal Ssd2 transitions to a high state, a high voltage Vsub2 of the inverted second auxiliary data signal Ssd2 is added to Vd2 that is charged in the second coupling capacitor Cc2, so that a voltage Vd2+Vsub2 is provided to the second liquid crystal capacitor Clc2 and the second storage capacitor Cst2.

Here, the second pixel voltage Vp2 becomes $Vd2+(Cc2'/Ct2) \times \Delta Vsub2$.

Cc2' is a capacitance of the second coupling capacitor Cc2, Ct2 is Cc2'+a capacitance of the capacitor of the second data line, and Vsub2 is a second auxiliary data voltage.

Subsequently, when the first gate signal Sg1 transitions to a low state, the second thin film transistor T2 is turned off, the inverted second data signal Sd2 and the inverted second auxiliary data signal Ssd2 also transition to a low state.

Here, a phase of the inverted second auxiliary data signal Ssd2 is delayed compared to the inverted second data signal Sd2.

Thus, the second pixel voltage Vp2 of the second liquid crystal capacitor Clc2 is maintained at $Vd2+(Cc2'/Ct2) \times \Delta Vsub2$ that is charged in the second storage capacitor Cst2.

As a result, with respect to the second pixel P2, the second data signal Sd2 and the second auxiliary data signal Ssd2 during the second frame 2F are inverted from those during the first frame 1F.

Thus, the second pixel voltage Vp2 is inverted from negative to positive frame by frame, and vice versa.

Next, in the first fame 1F while driving a third pixel P3, the second gate signal Sg2 is applied to the second gate line G2. In a T21 section in which the second gate signal Sg2 is in a high state, a third thin film transistor T3 (shown in FIG. 1B) is turned on.

Here, the second gate signal Sg2 is provided after the first gate signal Sg1, so that a third pixel voltage Vp3 is maintained at a voltage previously charged in a third storage capacitor Cst3 for a specific time.

When the third thin film transistor T3 is turned on, the first data signal Sd1 provided from the first data line D1 is provided to a third liquid crystal capacitor Clc3 and the third storage capacitor Cst3.

Thus, the third pixel voltage Vp3 at 0V, which is a low voltage of the first data signal Sd1, is charged in a pixel electrode of the third liquid crystal capacitor Clc3. Here, since the first auxiliary data signal Ssd1 provided to the first auxiliary data line Ds1 is in a high state, a high voltage Vsub1 of the first auxiliary data signal Ssd1 is charged in the first coupling capacitor Cc1.

Subsequently, when the first auxiliary data signal Ssd1 transitions to a low state, a voltage −Vsub1 charged in the first coupling capacitor Cc1 is discharged and provided to the third liquid crystal capacitor Clc3 and the third storage capacitor Cst3. Thus, the third pixel voltage Vp3 applied to the third liquid crystal capacitor Clc3 becomes −Vsub1.

Here, the third pixel voltage Vp3 becomes $-(Cc1'/Ct1) \times \Delta Vsub1$.

Cc1' is the capacitance of the first coupling capacitor Cc1, Ct1 is Cc1'+the capacitance of the capacitor of the first data line, and Vsub1 is the first auxiliary data voltage.

Subsequently, when the second gate signal Sg2 transitions to a low state, the third thin film transistor T3 is turned off, and the first auxiliary data signal Ssd1 and the first data signal Sd1 transition to a high state.

Here, a phase of the first auxiliary data signal Ssd1 is delayed compared to the first data signal Sd1.

Thus, the third pixel voltage Vp3 of the third liquid crystal capacitor Clc3 is maintained for one frame at $-(Cc1'/Ct1) \times \Delta Vsub1$ that is charged in the third storage capacitor Cst3.

Next, in a second frame, the second gate signal Sg2 is provided to the second gate line G2. Here, in a T22 section in which the second gate signal Sg2 is in a high state, the third thin film transistor T3 is turned on.

Here, the second gate signal Sg2 is provided after a first gate signal Sg1, so that the third pixel voltage Vp3 is maintained at a voltage previously charged in the third storage capacitor Cst3.

When the third thin film transistor T3 is turned on, an inverted first data signal Sd1 provided from the first data line D1 is provided to the third liquid crystal capacitor Clc3 and the third storage capacitor Cst3.

Thus, the third pixel voltage Vp3 at a voltage Vd1, which is a high voltage of the inverted first data signal Sd1, is charged to a pixel electrode of the third liquid crystal capacitor Clc3. Here, since an inverted first auxiliary data signal Ssd1 provided to a first auxiliary data line Ds1 is in a low state, the voltage Vd1 is also charged to the first coupling capacitor Cc1.

Subsequently, when the inverted first auxiliary data signal Ssd1 transitions to a high state, a high voltage Vsub1 of the first auxiliary data signal Ssd1 is additionally applied to the first coupling capacitor Cc1 in which the voltage Vd1 has been charged, so that Vd1+Vsub1 is provided to the third liquid crystal capacitor Clc3 and the third storage capacitor Cst3.

Here, the third pixel voltage Vp3 becomes $Vd1+(Cc1'/Ct1) \times \Delta Vsub1$.

Cc1' is the capacitance of the first coupling capacitor, Ct1 is Cc1'+a capacitance of the capacitor of the first data line, and Vsub1 is a first auxiliary data voltage.

Subsequently, when the second gate signal Sg2 transitions to a low state, the third thin film transistor T3 is turned off, and the inverted first data signal Sd1 and the inverted first auxiliary data signal Ssd1 also transition to a low state.

Here, a phase of the inverted first auxiliary data signal Ssd1 is delayed compared to the inverted first data signal Sd1.

Thus, the third pixel voltage Vp3 of the third liquid crystal capacitor Clc3 is maintained at $Vd1+(Cc1'/Ct1) \times \Delta Vsub1$ that is charged in the third storage capacitor Cst3.

As a result, with respect to the third pixel P3, the first data signal Sd1 and the first auxiliary data signal Ssd1 during the second frame 2F are inverted from that during the first frame 1F.

Thus, a polarity of the third pixel voltage Vp3 is inverted from negative to positive frame by frame, and vice versa.

Next, in the first frame 1F while driving a fourth pixel P4, the second gate signal Sg2 is provided to the second gate line G2. In the T21 section in which the second gate signal Sg2 is in a high state, a fourth thin film transistor T4 (shown in FIG. 1B) is turned on.

Here, the second gate signal Sg2 is provided after the first gate signal Sg1, a fourth pixel voltage Vp4 is maintained at a voltage previously charged in a fourth storage capacitor Cst4 for a suitable time (e.g., a specific time).

When the fourth thin film transistor T4 is turned on, a second data signal Sd2 provided to the second data line D2 is provided to a fourth liquid crystal capacitor Clc4 and the fourth storage capacitor Cst4.

Thus, a fourth pixel voltage at a voltage Vd2, which is a high voltage of the second data signal Sd2, is charged to a pixel electrode of the fourth liquid crystal capacitor Clc4. Here, the second auxiliary data signal Ssd2 provided to the second auxiliary data line Ds2 is in a low state, and thus the voltage Vd2 is also charged in the second coupling capacitor Cc2.

Subsequently, when the second auxiliary data signal Ssd2 transitions to a high state, a high voltage Vsub2 of the second auxiliary data signal Ssd2 is added to the voltage Vd2 that is charged in the second coupling capacitor Cc2, so that Vd2+Vsub2 is provided to the fourth liquid crystal capacitor Clc4 and the fourth storage capacitor Cst4.

Here, the fourth pixel voltage Vp4 becomes $Vd2+(Cc2'/Ct2) \times \Delta Vsub2$.

Cc2' is the capacitance of the second coupling capacitor, Ct2 is Cc2'+a capacitance of the capacitor of the second data line, and Vsub2 is a second auxiliary data voltage.

Subsequently, when the second gate signal Sg2 transitions to a low state, the fourth thin film transistor T4 is turned off, and the second data signal Sd2 and the second auxiliary data signal Ssd2 also transition to a low state.

Here, a phase of the second auxiliary data signal Ssd2 is delayed compared to the second data signal Sd2.

Thus, the fourth pixel voltage Vp4 of the fourth liquid crystal capacitor Clc4 is maintained during one frame at $Vd2+(Cc2'/Ct2) \times \Delta Vsub2$ that is charged in the fourth storage capacitor Cst4.

Next, in the second frame 2F, the inverted second gate signal Sg2 is provided to the second gate line G2. Here, in the T22 section in which the second gate signal Sg2 is in a high state, the fourth thin film transistor T4 is turned on.

Here, the second gate signal Sg2 is provided after a first gate signal Sg1, so that the fourth pixel voltage Vp4 is maintained at a voltage previously charged in the fourth storage capacitor Cst4 for a suitable time (e.g., a specific time).

When the fourth thin film transistor T4 is turned on, the inverted data signal Sd2 provided to the second gate line G2 is provided to the fourth liquid crystal capacitor Clc4 and the fourth storage capacitor Cst4.

Thus, the fourth pixel voltage Vp4 at 0V, which is a low voltage of the inverted second data signal Sd2, is applied to a pixel electrode of the fourth liquid crystal capacitor Clc4. Here, since the inverted second auxiliary data signal Ssd2 provided to the second auxiliary data line Ds2 is in a high state, a high voltage −Vsub2 of the inverted second auxiliary data signal Ssd2 is charged in the second coupling capacitor Cc2.

Subsequently, when the inverted second auxiliary data signal Ssd2 transitions to a low state, the voltage −Vsub2 charged in the second coupling capacitor Cc2 is discharged and provided to the fourth liquid crystal capacitor Clc4 and the fourth storage capacitor Cst4.

Here, the fourth pixel voltage Vp4 becomes $-(Cc2'/Ct2) \times \Delta Vsub2$.

Cc2' is the capacitance of the second coupling capacitor Cc2, Ct2 is Cc2'+a capacitance of the capacitor of the second data line, and Vsub2 is a second auxiliary data voltage.

Subsequently, when the inverted second gate signal Sg2 transitions to a low state, the fourth thin film transistor T4 is turned off, and the inverted second data signal Sd2 and the inverted second auxiliary data signal Ssd2 transition to a high state.

Here, a phase of the inverted second auxiliary data signal Ssd2 is delayed compared to the inverted second data signal Sd2.

Thus, the fourth pixel voltage Vp4 of the fourth liquid crystal capacitor Clc4 is maintained at $-(Cc2'/Ct2) \times \Delta Vsub2$ that is charged in the fourth storage capacitor Cst4.

As a result, with respect to the fourth pixel P4, the second data signal Sd2 and the second auxiliary data signal Ssd2 during the second frame 2F are inverted from that of the first frame 1F.

Thus, a polarity of the fourth pixel voltage Vp4 is also inverted from positive to negative frame by frame, and vice versa.

As described above, the method of driving a liquid crystal display device according to the described embodiments of the present invention explained in reference to the first to fourth pixels P1 to P4 satisfies Formula 1 when the pixel voltage Vp is positive.

$$\text{Pixel voltage } (Vp) = Vd + (Cc/Ct) \times \Delta Vsub \quad \text{Formula 1}$$

Further, when the pixel voltage Vp is negative, the method satisfies Formula 2.

$$\text{Pixel voltage } (Vp) = -(Cc/Ct) \times \Delta Vsub \quad \text{Formula 2}$$

In Formulae 1 and 2, Vd is a data voltage, Cc is a capacitance of a coupling capacitor, Ct is Cc+a capacitance of a capacitor of a data line, and Vsub is an auxiliary data voltage.

In the liquid crystal capacitor Clc, a voltage Vp−Vcom is applied between a pixel electrode to which the pixel voltage Vp is applied and the common electrode to which a common voltage Vcom is applied.

Thus, a uniform voltage may be applied to the liquid crystal capacitors Clc using a data voltage lower than that of a liquid crystal display device driven by the conventional dot inversion method.

As a result, the first auxiliary data signal Ssd1 and the second auxiliary data signal Ssd2 provided to the plurality of pixels of the liquid crystal panel 10 are inverted frame by frame.

Here, the second data signal Sd2 is an inverted version of the first data signal Sd1, and the second auxiliary data signal Ssd2 is an inverted version of first auxiliary data signal Ssd1. Likewise, the inverted second data signal Sd2 is an inverted version of the first data signal Sd1, and the inverted second auxiliary data signal Ssd2 is an inverted version of the first auxiliary data signal Ssd1.

Thus, a polarity of the pixel voltage Vp is inverted from positive to negative and from negative to positive, so that the liquid crystal display device is driven by the dot inversion method.

Figures 5A, 5B:
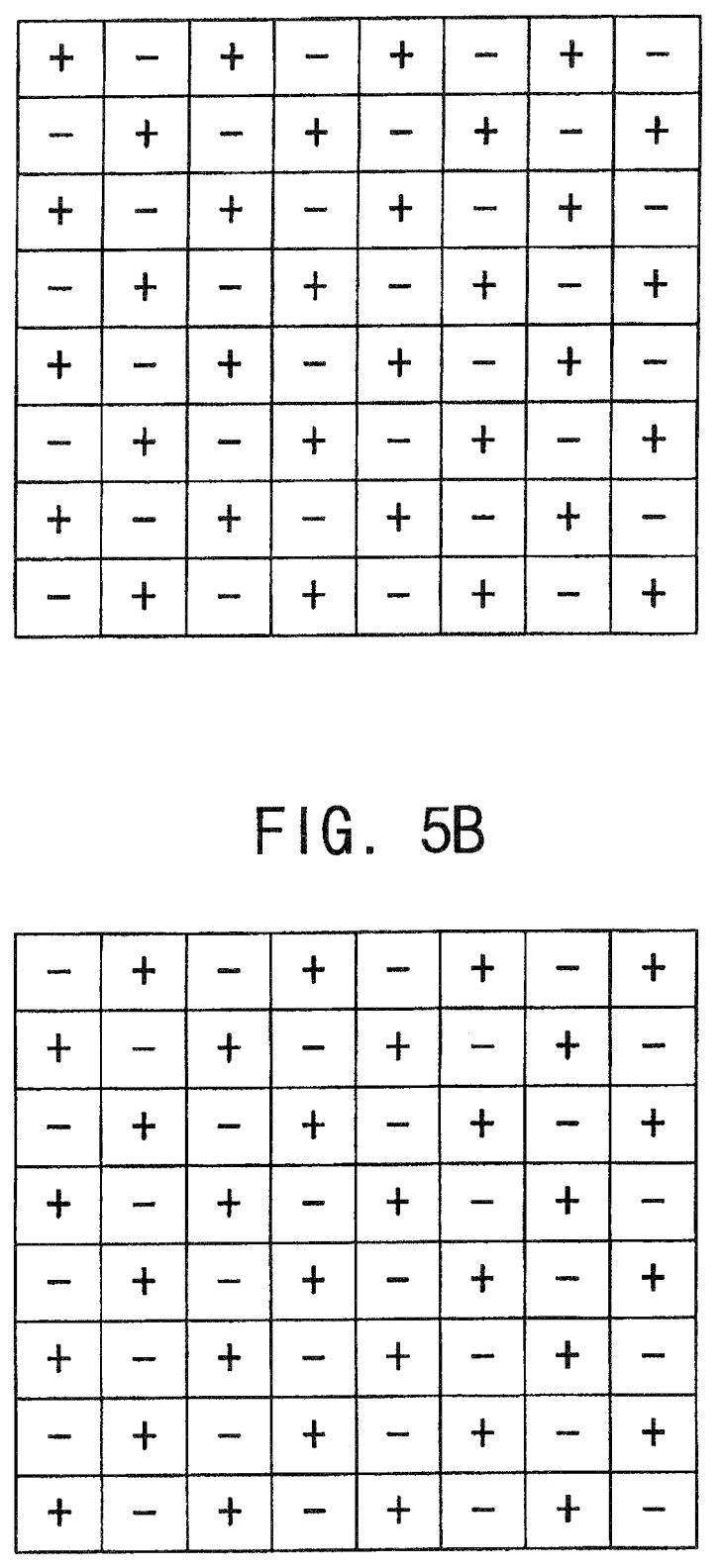

FIGS. 5A and 5B illustrate a dot inversion driving method according to embodiments of the present invention.

First, referring to FIG. 5A, a plurality of pixels are arranged in a matrix, and adjacent pixels (up/down and left/right) have pixel voltages of opposite polarities to one another.

FIG. 5B shows the pixel voltages in a next frame of FIG. 5A, and the pixel voltages are inverted in comparison to FIG. 5A.

Thus, a liquid crystal display device according to the described embodiments of the present invention may be driven by a dot inversion method in which the pixel voltages having opposite polarities between adjacent pixels are inverted frame by frame.

Also, a liquid crystal display device and a method of driving the same according to the described embodiments of the present invention may be implemented in a dot inversion method with reduced power consumption.

Although the present invention has been described with reference to specific exemplary embodiments thereof, it will be understood by those skilled in the art that a variety of modifications and variations may be made to the present invention without departing from the spirit or scope of the present invention defined in the appended claims, and their equivalents.

What is claimed is:

1. A liquid crystal display (LCD) device comprising:
   a substrate;
   a plurality of data lines on the substrate;
   a plurality of gate lines crossing the data lines;
   a plurality of pixels arranged in a matrix and coupled to the data lines and the gate lines;
   a first auxiliary data line and a second auxiliary data line extending on the substrate and crossing the data lines;
   a plurality of first coupling capacitors coupled between odd data lines among the data lines and the first auxiliary data line; and
   a plurality of second coupling capacitors coupled between even data lines among the data lines and the second auxiliary data line,
   wherein the first auxiliary data line is only coupled to the odd data lines among the data lines through the first coupling capacitors, and
   wherein the second auxiliary data line is only coupled to the even data lines among the data lines through the second coupling capacitors.

2. The LCD device according to claim 1,
   wherein a first electrode of each of the first coupling capacitors capacitor is coupled to the first auxiliary data line, and a second electrode of each of the first coupling capacitors is coupled to a corresponding one of the odd data lines, and
   wherein a first electrode of each of the second coupling capacitors is coupled to the second auxiliary data line, and a second electrode of each of the second coupling capacitors is coupled to a corresponding one of the even data lines.

3. The LCD device according to claim 2, wherein the first electrodes of the first and second coupling capacitors are formed of the same material as a gate electrode of a thin film transistor included in each of the plurality of pixels.

4. The LCD device according to claim 2, wherein the second electrodes of the first and second coupling capacitors are formed of the same material as source and drain electrodes of a thin film transistor included in each of the plurality of pixels.

5. The LCD device according to claim 1, wherein the first and second auxiliary data lines are coupled to a data driver.

6. The LCD device according to claim 5, wherein the data driver is configured to supply a first auxiliary data signal and a second auxiliary data signal, which are in an inverted relationship, to the first auxiliary data line and the second auxiliary data line, respectively.

7. A method of driving a liquid crystal display device, the method comprising:
   providing gate signals to a plurality of gate lines on a substrate;
   providing data signals to a plurality of data lines that cross the gate lines; and
   providing a first auxiliary data signal and a second auxiliary data signal, which are in an inverted relationship, to a first auxiliary data line and a second auxiliary data line, respectively, the first auxiliary data line being coupled only to odd data lines from among the plurality of data lines through a plurality of first coupling capacitors, and the second auxiliary data line being coupled only to even data lines among the plurality of data lines through a plurality of second coupling capacitors, thereby pixel voltages of a plurality of pixels coupled to the data lines and the gate lines are dot-inverted.

8. The method according to claim 7, wherein the gate signals are sequentially provided to the gate lines.

9. The method according to claim 7, wherein the data signals are inverted between adjacent data lines among the plurality of data lines.

10. The method according to claim 7, wherein the first auxiliary data signal and the second auxiliary data signal are phase-delayed from their corresponding data signals among the data signals.

11. The method according to claim 7, wherein the data signals are inverted frame by frame.

12. The method according to claim 7, wherein the first auxiliary data signal and the second auxiliary data signal are inverted frame by frame.

13. The method according to claim 7, wherein the first auxiliary data signal and the second auxiliary data signal are provided by a data driver.

14. The method according to claim 7, wherein when the pixel voltages are positive, the pixel voltages satisfy a formula described as:

$$Vp = Vd + (Cc/Ct) \times \Delta Vsub$$

where Vp is a pixel voltage, Vd is a data voltage, Cc is a capacitance of a coupling capacitor, Ct is Cc + a capacitance of a capacitor of a data line, and Vsub is an auxiliary data voltage.

15. The method according to claim 7, wherein when the pixel voltages are negative, the pixel voltages satisfy a formula described as:

$$Vp = -(Cc/Ct) \times \Delta Vsub$$

where Vp is a pixel voltage, Cc is a capacitance of a coupling capacitor, Ct is Cc + a capacitance of a capacitor of a data line, and Vsub is an auxiliary data voltage.

16. The method according to claim 7, wherein the pixel voltages are inverted frame by frame.

17. The method according to claim 7, wherein the pixel voltages have different polarities between adjacent pixels among the plurality of pixels.

18. The method according to claim 7, wherein a voltage applied to a liquid crystal capacitor included in each of the plurality of pixels is determined as Vp-Vcom, where Vp is a pixel voltage, and Vcom is a common voltage.

19. A liquid crystal display device (LCD) comprising:
a substrate;
a plurality of data lines on the substrate and comprising a plurality of odd data lines and a plurality of even data lines alternately disposed on the substrate;
a plurality of gate lines crossing the plurality of data lines;
a plurality of pixels arranged in a matrix and coupled to the data lines and the gate lines;
a first auxiliary data line extending on the substrate and crossing the data lines and coupled to only the odd data lines among the data lines;
a second auxiliary data line extending on the substrate and crossing the data lines and coupled to only the even data lines among the data lines.,
a plurality of first coupling capacitors each coupled between a corresponding odd data line among the odd data lines and the first auxiliary data line; and
a plurality of second coupling capacitors each coupled between a corresponding even data line among the even data lines and the second auxiliary data line.

20. The LCD device according to claim 19, further comprising a data driver configured to supply a first auxiliary data signal and a second auxiliary data signal to the first auxiliary data line and the second auxiliary data line, respectively,
wherein the second auxiliary data signal is an inverted signal of the first auxiliary data signal.

* * * * *